US006401239B1

(12) United States Patent
Miron

(10) Patent No.: US 6,401,239 B1
(45) Date of Patent: Jun. 4, 2002

(54) SYSTEM AND METHOD FOR QUICK DOWNLOADING OF ELECTRONIC FILES

(75) Inventor: Mordechay Miron, Tel-Aviv (IL)

(73) Assignee: B.I.S. Advanced Software Systems Ltd., Jerusalem (IL)

( * ) Notice: Subject to any disclaimer, the term of this patent is extended or adjusted under 35 U.S.C. 154(b) by 0 days.

(21) Appl. No.: 09/273,257

(22) Filed: Mar. 22, 1999

(51) Int. Cl.⁷ .............................................. G06F 9/455
(52) U.S. Cl. ............................. 717/11; 717/1; 707/203
(58) Field of Search ............................. 717/1, 11, 100, 717/3; 707/203, 204; 703/23, 25; 710/14; 714/2

(56) References Cited

U.S. PATENT DOCUMENTS

| | | | | |
|---|---|---|---|---|
| 4,558,413 A | | 12/1985 | Schmidt et al. ............. 707/203 |
| 5,473,772 A | * | 12/1995 | Halliwell et al. ............. 717/11 |
| 5,649,200 A | * | 7/1997 | Leblang et al. ................ 717/3 |
| 5,771,354 A | * | 6/1998 | Crawford .................... 709/229 |
| 5,809,251 A | | 9/1998 | May et al. ................... 709/223 |
| 5,832,275 A | * | 11/1998 | Olds ........................... 717/11 |
| 5,835,911 A | * | 11/1998 | Nakagawa et al. ......... 707/203 |
| 5,838,812 A | * | 11/1998 | Pare, Jr. et al. ............. 382/115 |
| 5,845,077 A | * | 12/1998 | Fawcett ...................... 709/221 |
| 5,903,897 A | * | 5/1999 | Carrier, III et al. ......... 707/203 |
| 6,014,651 A | * | 1/2000 | Crawford .................... 705/400 |
| 6,018,747 A | * | 1/2000 | Burns et al. ................. 707/203 |
| 6,023,586 A | * | 2/2000 | Gaisford et al. .............. 717/11 |
| 6,052,803 A | * | 4/2000 | Bhatia et al. ................. 714/49 |
| 6,073,214 A | * | 6/2000 | Fawcett ...................... 711/133 |
| 6,195,432 B1 | * | 2/2001 | Takahashi et al. ............. 380/9 |
| 6,199,204 B1 | * | 3/2001 | Donohue ...................... 717/11 |
| 6,202,207 B1 | * | 3/2001 | Donohue ...................... 717/11 |
| 6,209,128 B1 | * | 3/2001 | Gerard et al. ................. 717/11 |
| 6,219,669 B1 | * | 4/2001 | Haff et al. .................... 707/10 |
| 6,317,789 B1 | * | 11/2001 | Rakavy et al. .............. 709/224 |

OTHER PUBLICATIONS

Reichenberger, "Delta storage for arbitrary non text files", ACM pp 144–152, May 1991.*
Korel et al, "Version management in distributed network environment", ACM pp 161–166, May 1991.*
Spector, "Performing remote operations eggiciently on a local computer network", Comm. of the ACM, pp 246–260, vol. 25, No. 4, Apr. 1982.*
Request for Comments 1321 found on Sep. 9, 1999 12:08 at.

* cited by examiner

Primary Examiner—Anil Khatri
(74) Attorney, Agent, or Firm—Eitan, Pearl, Latzer & Cohen-Zedek

(57) ABSTRACT

A system for transferring a delta file from a first computer to a second computer includes a delta builder on the first computer, a download manager, and a restorer on the second computer. The first computer has a first version of a file and a second version of the file, and the second computer has the first version of the file. The delta builder generates the delta file from the first and second versions on the first computer. The download manager transfers the delta file from the first computer to the second computer. The restorer generates the second version from the first version on the second computer and the transferred delta file.

35 Claims, 10 Drawing Sheets

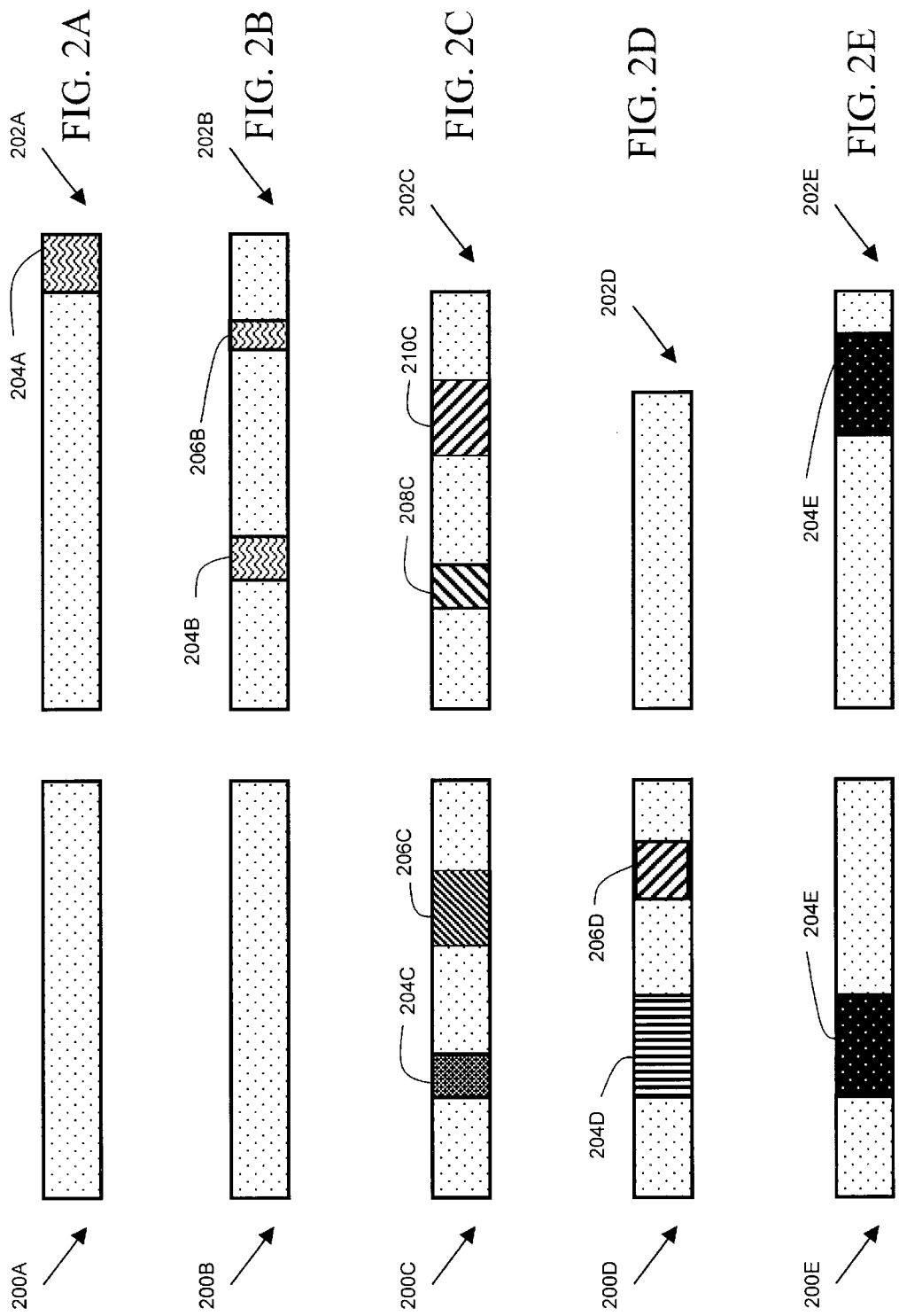

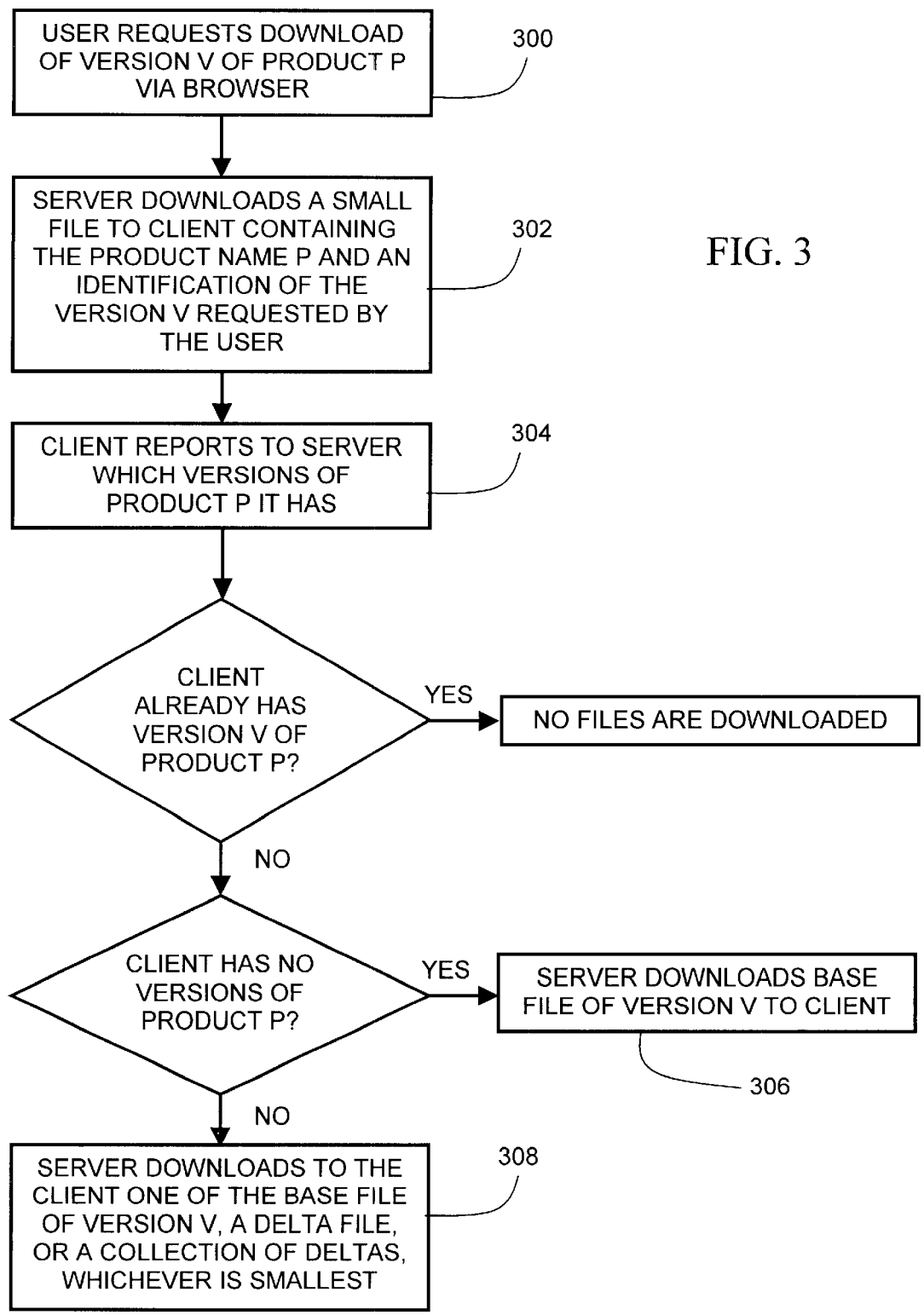

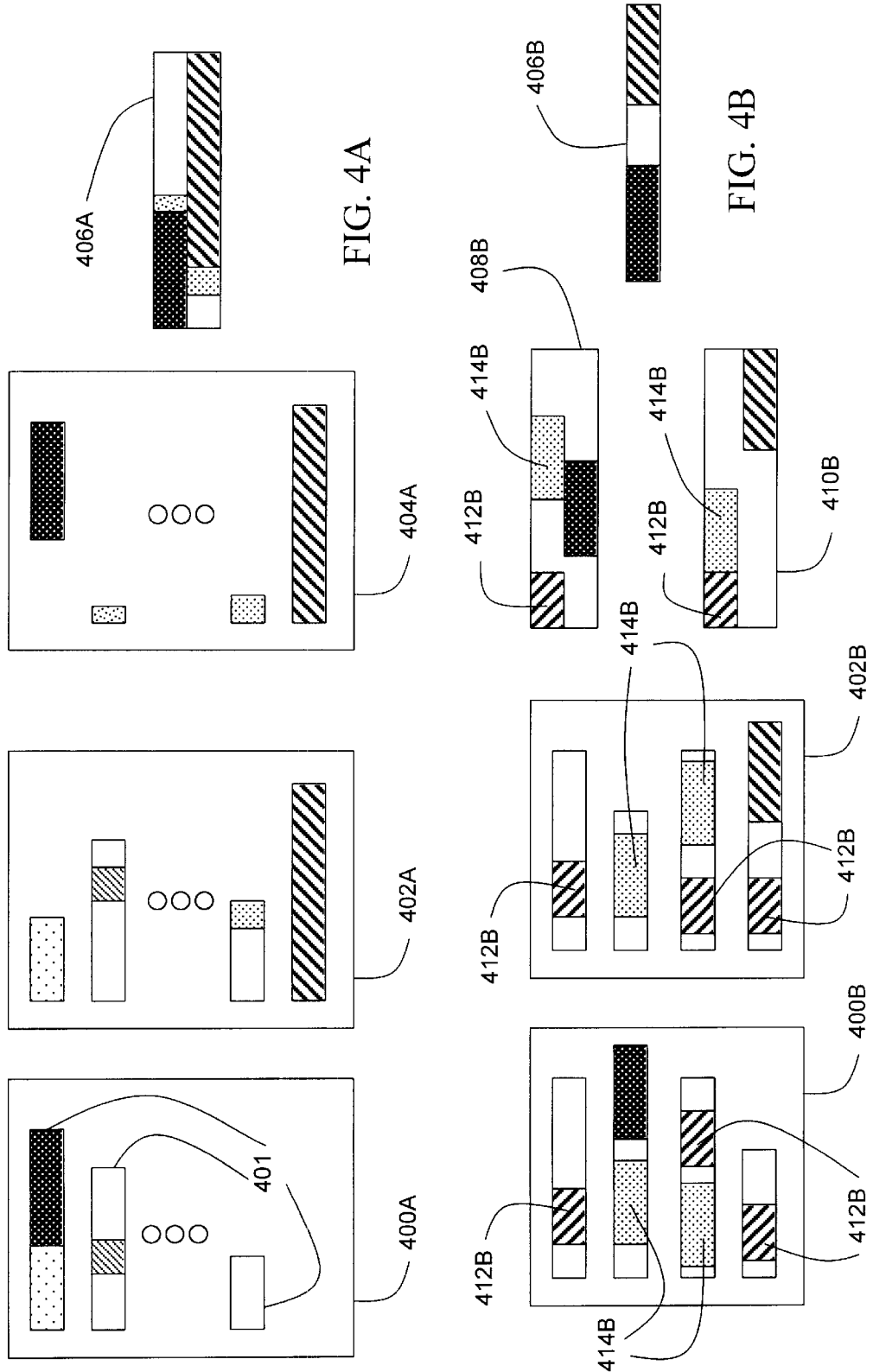

SYSTEM AND METHOD FOR QUICK DOWNLOADING OF ELECTRONIC FILES

FIELD OF THE INVENTION

The present invention relates to downloading of electronic files from the Internet or other communication channels.

BACKGROUND OF THE INVENTION

The Internet is a worldwide interconnection of smaller networks of computers communicating among themselves via the TCP/IP protocol. One of the primary features of the Internet is the ability to download electronic files ("files") from one host to another, using various types of file transfer protocols such as File Transfer Protocol (FTP), HyperText Transfer Protocol (HTTP), etc. The increasing popularity of the Internet as a whole, and as a medium for downloading files in particular, has led to network congestion and has resulted in slower download times.

Approximately 80% of all files transferred over the Internet are updated versions of previous files, for example, software updates, customer and supplier details, informational and statistical databases, books, manuals, encyclopaedias, and more. Furthermore, updated files often differ from the previous versions by only 10% or less. For example, a parts catalog listing all parts available from a manufacturer generally changes only slightly from one update to the next, since the number of parts that are added to or deleted from the catalog is generally small relative to the total number of parts in the catalog.

Currently, a user having a file on his computer and wishing to download an updated version of the file from the Internet downloads the entire updated version. An exception is a software patch in which a self-extracting file containing the patch and a program known as a restorer is downloaded to the user's computer. The patch contains only the difference between the updated software version and the user's software version. The restorer directly updates installed software on the user's computer with the patch.

Downloading large files can be a time-consuming process. Occasionally the downloading process is interrupted, for example, due to the network connection failing or due to a power failure. In the case of an interrupted download, the file being downloaded at the time of the interruption must be downloaded again in its entirety, even if most of the file had already been transferred at the time of the interruption.

Therefore, it would be beneficial to reduce the size of the files being downloaded and therefore reduce the amount of time required to download files. It would also be beneficial to be able to resume the download of a file from the point where it was interrupted.

There are currently three main technologies for sending marketing information over the Internet directly:

a) advertisements on Web pages;

b) electronic mail (e-mail) messages;

c) Internet advertising using push technology.

Advertisements appearing on Web pages involve almost no targeting of the viewing audience, and are viewed only by those users that browse the particular web pages on which the advertisement appears.

E-mail messages are non-interactive and involve only partial targeting. For example, users who have purchased software and who wish to receive information about the software may register their e-mail addresses in a database of interested users that is maintained by the company that produces the software. The company then sends an e-mail message to the interested users whenever there is news regarding the software. If files are attached to the e-mail message, the user may choose not to open the attachment or save the files. The user may even choose not to read the e-mail message.

There are currently deals whereby a user receives a computer for free in return for allowing unsolicited advertisements to appear on the computer whenever it is connected to the Internet. This is known as Internet Advertising using "push" technology, because instead of the user requesting information from servers, the servers push the unsolicited information to the user. The servers maintain a database of user identifiers, for example, the IP address of the computer. One of the problems with Internet Advertising is that lack of audience targeting. Another problem is that the user is repeatedly interrupted while using the computer, which can be very disruptive and annoying. Finally, advertisements are sent only to those users who have agreed to receive them, and the vast majority of Internet users never sea these pushed advertisements.

It would be beneficial to have a system for sending products and interactive marketing material in a non-disruptive manner to targeted users who have expressed an interest in receiving them without the suppliers of the products and marketing material requiring a database of targeted users.

One of the aspects of downloading ties is download for authorized clients only. For example, in an Internet software shop where the user selects software to download, the user is directed to a payment details form for providing account details such as a password or credit card details. Once the account details have been verified the user may download the software. If the account details are not verified, then the software may not be downloaded.

If the download is interrupted in the middle, the user generally has to complete the payment details form again and trust the he will not be charged twice by the shop. It is also expected that downloading bug fixes to the software will be free, while updated versions cost money.

SUMMARY OF THE INVENTION

The present invention provides a client-server system for managing versions of files an the client computer and the server computer, and for downloading versions of files from the server computer to the client computer.

The present invention also provides a client-server system for sending products and interactive marketing material in a non-disruptive manner to users who have expressed an interest in receiving them.

The present invention also provides a token based authorization system for download of files.

There is therefore provided in accordance with a preferred embodiment of the present invention a system for transferring a delta file from a first computer to a second computer, the first computer having a first version of a file and a second version of the file, and the second computer having the first version of the file. The system includes a delta builder for generating the delta file from the first and second versions on the first computer, a download manager for transferring the delta file from the first computer to the second computer, and a restorer for generating the second version from the first version on the second computer and the transferred delta file.

Moreover, in accordance with a preferred embodiment of the present invention, the delta file is generated based upon a bit analysis of the first and second versions on the first computer.

Furthermore, in accordance with a preferred embodiment of the present invention, the delta builder includes means for generating a first digital stamp from the first version on the first computer, the delta file includes the first digital stamp, the restorer includes means for generating a second digital stamp from the first version on the second computer, and the second version on the second computer is generated only is the second digital stamp matches the first digital stamp.

Additionally, in accordance with a preferred embodiment of the present invention, the download manager includes a download manager server on the first computer, and a download manager client on the second computer.

Moreover, in accordance with a preferred embodiment of the present invention, the download manager server includes means for communicating with the download manager client over an Internet Protocol (IP) network, and the download manager client includes means for communicating with the download manager server over an Internet Protocol (IP) network.

Furthermore, in accordance with a preferred embodiment of the present invention, the system further includes a database for storing the first and second versions of the file and for storing the delta file.

Additionally, in accordance with a preferred embodiment of the present invention, the system further includes a maintenance unit for importing an imported file into the database.

Moreover, in accordance with a preferred embodiment of the present invention, the imported file is a third version of the file or an additional delta file between one of the first and second versions and a third version of the file.

Additionally, in accordance with a preferred embodiment of the present invention, the system further includes a compressor for compressing the generated delta file, and a decompressor for decompressing the transferred delta file.

Moreover, in accordance with a preferred embodiment of the present invention, the system further includes means for automatically performing post-download actions on the generated second version.

Furthermore. In accordance with a preferred embodiment of the present invention, the post-download actions include at least one of the group comprising saving the generated second version to a storage unit, decompressing the generated second version, extracting the generated second version and installing the generated second version.

Additionally, in accordance with a preferred embodiment of the present invention, the first version of the file is an archive of a first folder version of a folder of files, the second version of the file is a second folder version of the folder of files, and the system further includes an extractor for extracting the second folder version from the generated second file.

There is also provided in accordance with a preferred embodiment of the present invention a system for transferring a delta file from a first computer to a second computer, the first computer having a first version of a folder of files and a second version of the folder, and the second computer having the first version of the folder. The system includes a delta builder for generating a delta folder from the first and second version on the first computer, an archiver for archiving the delta folder into the delta file, a download manager for transferring the delta file from the first computer to the second computer, an extractor for extracting the delta folder from the transferred delta file, and a restorer for generating the second version from the first version on the second computer and the extracted delta folder.

There is also provided in accordance with a preferred embodiment of the present invention a system for resuming an interrupted transfer of a file from a first computer having a complete version of the file to a second computer having an incomplete version of the file, the incomplete version missing a portion of the complete version, and the incomplete version having previously been transferred to the second computer during the interrupted transfer. The system includes a download manager server on the first computer for transferring only the missing portion to the second computer, and a download manager client on the second computer for receiving the missing portion and combining it with the incomplete version to form the complete version on the second computer.

There is also provided in accordance with a preferred embodiment of the present invention a token based authorization system for download of a file from a first computer to a second computer. The system includes a client on the second computer for requesting download of the file and for transferring account information to an account server, a download service layer integrated with the account server, for generating a token, associating the token with a first authorization level and sending the token to the client if the account information is verified by the account server, and a server on the first computer for associating a second authorization level with the file, for receiving the token and the first authorization level from the download service layer, for receiving the token from the client, and for downloading the file to the client if the token received from the download service layer matches the token received from the client and if the first authorization level is no less than the second authorization level.

Moreover, in accordance with a preferred embodiment of the present invention, the client has a client identifier and the token is based upon the client identifier.

There is also provided in accordance with a preferred embodiment of the present invention a method for transferring a delta file from a first computer to a second computer, the first computer having a first version of a file and a second version of the file, and the second computer having the first version of the file. The method includes the steps of generating the delta file from the first and second versions on the first computer, transferring the delta file from the first computer to the second computer, and generating the second version from the first version on the second computer and the transferred delta file.

There is also provided in accordance with a preferred embodiment of the present invention a method for transferring a delta the from a first computer to a second computer, the first computer having a first version of a folder of files and a second version of the folder, and the second computer having the first version of the folder. The method includes the steps of generating a delta folder from the first and second variations on the first computer, archiving the delta folder into the delta file, transferring the delta file from the first computer to the second computer, extracting the delta folder from the transferred delta file, and generating the second, version from the first version on the second computer and the extracted delta folder, There is also provided in accordance with a preferred embodiment of the present invention a method for resuming an interrupted transfer of a file from a first computer having a complete version of the file to a second computer having an incomplete version of the file, the incomplete version missing a portion of the complete version, and the incomplete version having previously been transferred to the second computer during the interrupted transfer. The method includes the steps of transferring only the missing portion to the second computer, receiving the missing portion, and combining it with the incomplete version to form the complete version on the second computer.

There is also provided in accordance with a preferred embodiment of the present invention a method for downloading a file from a download server to a download client when the user of the download client is authorized to do so by an account server. The method includes the steps of associating the file with a first authorization level, and verifying account details of the user at the account server. If the step of verifying is successful, generating a token on the account server and associating the token with a second authorization level, sending the token from the account server to the download client, sending the token and the second authorization level from the account server to the download server, sending the token from the download client to the download server, and downloading the file from the download server to the client only if the second authorization level is no less than the first authorization level and if the token from the account server matches the token from the download client.

There is also provided in accordance with a preferred embodiment of the present invention a method for transferring files from a first computer to a second computer. The method includes the steps of the second computer reporting a version indicator to the first computer, the version indicator indicating which versions of the target file currently reside but which are not necessarily installed on the second computer, the first computer correlating the version indicator with either of at least one delta file and a base file in accordance with predetermined correlation criteria, thereby defining at least one correlated file, and the first computer transferring the correlated file to the second computer.

Moreover, in accordance with a preferred embodiment of the present invention, the method further includes the step of the second computer requesting a target file from the first computer.

BRIEF DESCRIPTION OF THE DRAWINGS

The present invention will be understood and appreciated more fully from the following detailed description taken in conjunction with the appended drawings in which:

FIGS. 2A–2E are schematic illustrations of example original versions of files and example updated versions of files;

FIG. 3 is a schematic flowchart illustration of a method for downloading versions of files from a server computer to a client computer, according to a preferred embodiment of the present invention;

FIGS. 4A and 4B are schematic illustrations of original folders of files and updated folders of files, according to a preferred embodiment of the present invention;

DETAILED DESCRIPTION OF THE PRESENT INVENTION

The present invention is directed to a client-server system for downloading versions of files from the server computer to the client computer. One important feature of the present invention 13 that in order to obtain an updated version of a file when one has the original file. It is only necessary to download the part of the updated file that differs from the original file. The term "delta file" is used throughout the specification and the claims to mean a file containing the difference between the updated file and the original file.

Figure 1A:
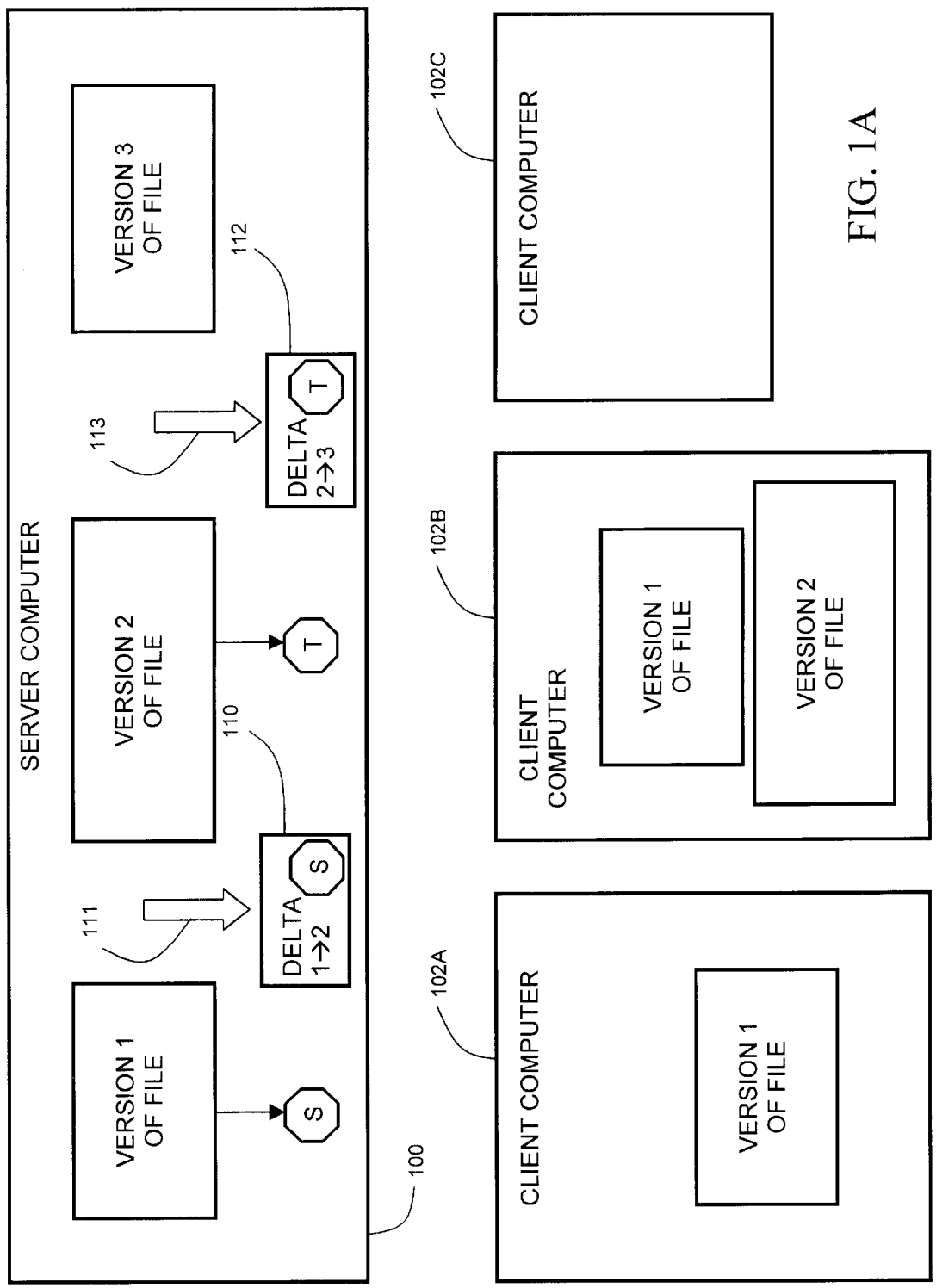
FIGS. 1A–1C are schematic illustrations of exemplary files on a server computer and client computers, according to a preferred embodiment of the present invention.
Figure 1B:
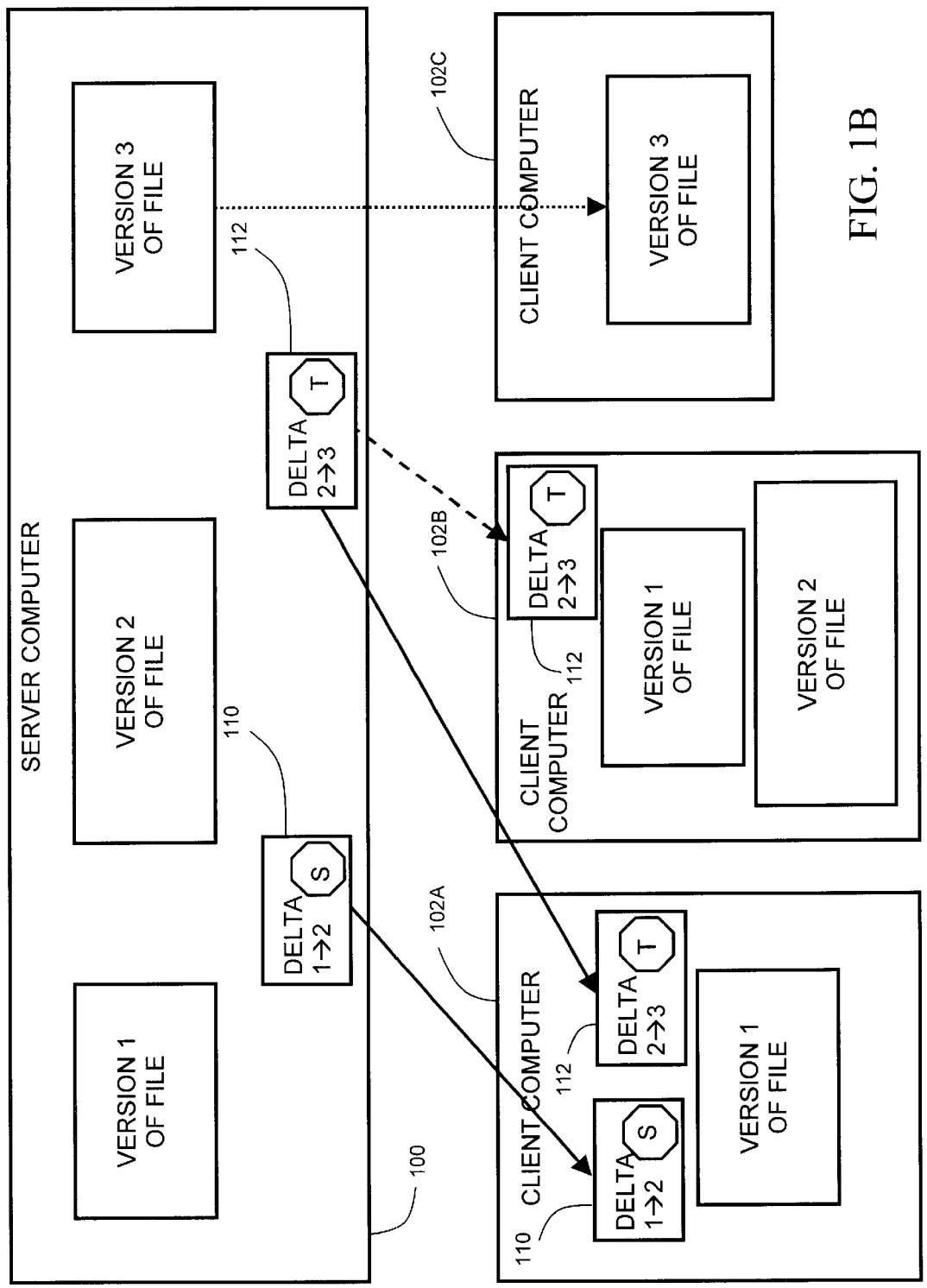
Figure 1C:
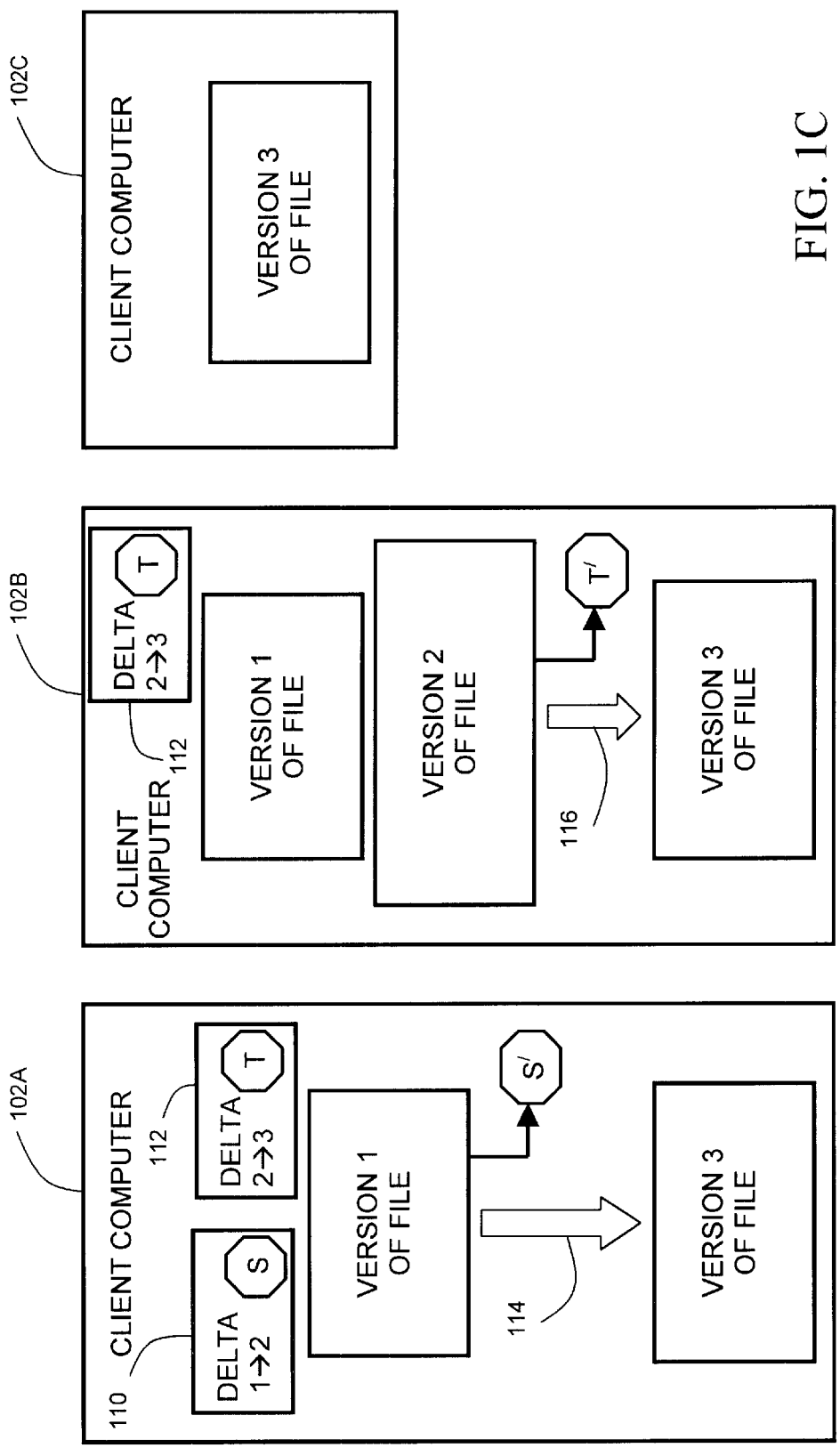

This is shown in FIGS. 1A, 1B and 1C, to which reference is now made, which are schematic illustrations of exemplary files on a server computer 100 and client computers 102A, 102B and 102C, according to a preferred embodiment of the present invention. The server computer 100 has a first version 1 of a file, a second version 2 of a file, and a third version 3 of a file. The client computer 102A has the same first version 1 of the file, the client computer 102B has the first version 1 and the second version 2 of the file, and the client it computer 102C has no versions of the file.

In FIG. 1A, a delta builder running on the server computer 100 analyzes the bits of the first version 1 and the second version 2 to generate a delta file 110 containing the difference between version 1 and version 2, as shown by arrow 111. The delta builder analyzes the bits of the second version 2 and the third version 3 to generate a delta file 112 containing the difference between version 2 and version 3, as shown by arrow 113.

In FIG. 1B, the client computers 102A, 102B and 102C have requested version 3 of the file from the server computer 100. The client-server system determines which files to download to each of the client computers 102A, 102B and 102C, always choosing is smallest the or combination of files. Since the client computer 102C has no versions of the file, the client server system downloads the entire version 3 of the file, as shown by the dotted arrow. The client computer 102B already has both version 1 of the file and version 2 of the file, therefore the client-server system downloads the smaller of the version 3 and the delta file 112. In the present example, the delta file 112 is smaller, and the download of the delta file 112 is shown by the dashed arrow. The client computer 102A has only version 1 of the file, therefore the client-server system downloads the smaller of the version 3 and the combination of the delta files 110 and 112. In the present example, the combination of the delta files 110 and 112 it smaller, and the download of the delta files 110 and 112 is shown by the solid arrow.

In FIG. 1C, a restorer running on the client computer 102B uses the delta file 112 and the version 2 of the file to generate the version 3 of the file, as shown by arrow 116. A restorer running on the client computer 102A uses the delta files 110 and 112 and the version 1 of the file, as shown by arrow 114.

Delta builders and restorers are commercially available, such as TransFast from B.I.S. Advanced Software Systems Ltd. of Ramat Gan, Israel.

It will be appreciated that since delta files are generally significantly smaller in size than the versions themselves, the time required to download the delta files is much less than the time required to download the entire version.

FIG. 1A also shows that the delta builder calculates a digital stamp S for version 1 of the file at the server computer 100, and stores the digital stamp S in the delta file 110. Similarly, the delta builder calculates a digital stamp T for version 2 of the file at the server computer 100, and storm the digital stamp T the in the delta file 112.

FIG. 1C shows that the restorer running on client computer 102A calculates a digital stamp S' for the version 1 of the file at the client computer 102A, and compares the digital stamp S' with the digital stamp S stored in the delta file 110. The restorer generates the versions 3 only if the digital stamps S' and S match. Similarly, the restorer running on client computer 102B calculates a digital stamp T' for the version 2 of the file at the client computer 102B, and compares the digital stamp T' with the digital stamp T stored in the delta file 112. The restorer generates the version 3 only if the digital stamps T' and T match. An example of a digital stamp is a digital hash of the entire file according to a hashing algorithm such as Message Digest 5 (MD5).

The file versions differ from one another in a combination of any of the ways shown in FIGS. 2A–2E, to which reference is now briefly made. FIGS. 2A–2E are schematic illustrations of example original versions of files and example updated versions of files. FIG. 2A shows that updated version 202A is formed by appending additional bits 204A to the end of original version 200A. FIG. 2B shows that updated version 202B is formed by inserting additional bits 204B and 206B at some points in original version 200B. FIG. 2C shows that updated version 202C is formed by replacing existing bits 204C and 206C by different bits 208C and 210C at some points in original version 200C. FIG. 2D shows that updated version 202D is formed by deleting existing bits 204D and 206D at some points from original version 200D. FIG. 2E shows that updated version 202E is formed by moving existing bits 204E from one point to another in original version 200E. It will be appreciated that the file versions may differ in other ways not illustrated in FIGS. 2A–2E, and that the other ways are covered in the scope of the present invention as well.

It will be appreciated that since the delta builder of FIG. 1A generates the delta files based upon a bit-analysis of the file versions, the format of the file versions is irrelevant. The algorithms used to generate the delta files work equally well on all files—for example, text files, graphics files, and compiled object code.

Reference is now made to FIG. 3, which is a schematic flowchart illustration of a method for downloading versions of files from a server computer to a client computer, according to a preferred embodiment of the present invention. The user requests (step 300) the download of a version V of a product P, for example via a browser on the client computer. The server downloads (step 302) a small file to the client containing the exact product name P and an identification of the exact version V requested by the user as they appear in the server database. The client reports (step 304) to the server which versions of the product P it has. If the client already has version V of the product P, then no files are downloaded from the server to the client. If them are no versions of the product P on the client then the server downloads (step 308) a special format of the complete file ("base file") of version V to the client. If the client has one or more versions of the product P, not including version V, the server checks (step 308) which of the base file, delta file or collection of delta files is smallest, and downloads (step 308) that to the client. In some cases, an old base file and at least one delta file is the smallest combination.

If a previous download of version V of the product P was interrupted, then the client has an incomplete base file, delta file or collection of delta files. During download (step 308 or 308), the client detects that it already has a file with the name of the file being downloaded. The client tells the server how many bytes it already has of the version file, and the server downloads only the remaining bytes.

According to a preferred embodiment of the present invention, the base and delta files are compressed in order to minimize the storage space required on the server computer and the client computer, and in order to further reduce the time required to download the files. Any compression method can be used, such as the method used by B.I.S. Compression and Archive, which is commercially available from B.I.S. Advanced Software Systems Ltd. of Ramat Gan, Israel.

The present invention is equally appropriate for the download of single files and for the download of folders of files. In the case of folders of files, there are two options for creating the delta file. This is shown in FIGS. 4A and 4B, to which reference is now made, which are schematic illustrations of original folders of files and updated folders of files, according to a preferred embodiment of the present invention. FIG. 4A shows an original folder 400A of files 401 and an updated folder 402A. A delta builder generates a delta folder 404A, which is then archived and compressed into a single delta file 400A. FIG. 4B shows an original folder 400B, and an updated folder 402B. The original folder 400B and the updated folder 402B are archived into single base files 408B and 410B respectively. A delta builder generates a delta file 406B from the base files 408B and 410B. It Will be appreciated that the option shown in FIG. 4A is useful for folders having a large number of dissimilar files, while the option shown in FIG. 4B is useful for folders having files in which the same information 412B and 414B is repeated over a number of files. Any archival method can be used, such as the method used by B.I.S. Compression and Archive which is commercially available from B.I.S. Advanced Software Systems Ltd. of Ramat Gan, Israel.

Referring back to FIG. 3, the small file downloaded from the server to the client in step 302 also contains information whether the original and updated versions are files or folders, and in the case of folders, which of the two options explained hereinabove was used to create the delta file.

Figure 5:
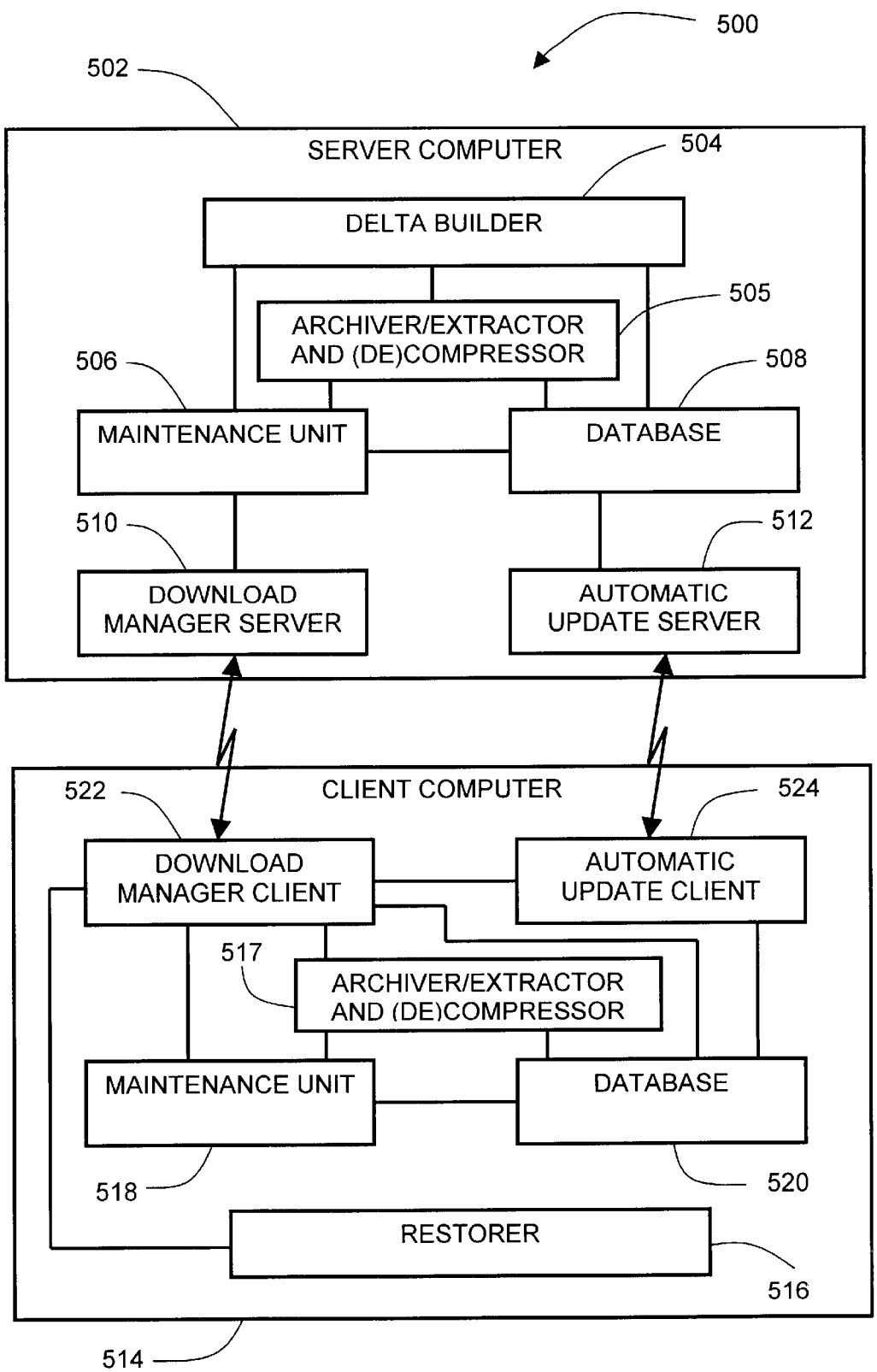
FIG. 5 is a schematic block diagram illustration of a client-server system, that implements the method of FIG. 3, according to a preferred embodiment of the present invention.

Reference is now made to FIG. 5, which is a schematic block diagram illustration of a client-server system, generally referenced 500, that implements the method of FIG. 3, according to a preferred embodiment of the present invention.

A server computer 502 comprises a delta builder 504, an archiver/extractor and compressor/decompressor ("archiver") 505, a maintenance unit 506, a database 508, a download manager server 510 and an automatic update server 512. The delta builder 504 is connected to the archiver 505, the maintenance unit 506 and the database 508. The archiver 505 is also connected to the maintenance unit 506 and the database 508. The maintenance unit 506 is also connected to the database 508 and to the download manager server 510. The database 508 is also connected to the automatic update server 512.

A client computer 514 comprises a restorer 516, an archiver/extractor and compressor/decompressor ("archiver") 517, a maintenance unit 518, a database 520, a download manager client 522, and an automatic update client 524. The download manager client 522 is connected to the restorer 518, the archiver 517, the maintenance unit 518, the database 520 and the automatic update client 524. The database 520 Is also connected to the maintenance unit 518, the archiver 517 and the automatic update client 524. The archiver 517 is also connected to the maintenance unit 518.

The download manager client 522 communicates with the download manager server 510, and the automatic update client 524 communicates with the automatic update server 512.

The delta builder 504 creates delta files from versions of files on the server computer 500, as explained hereinabove. The archiver 505 compresses the delta files into smaller files. If the versions are folders of files, then the archiver 505 archives the folders into single files, as explained hereinabove. The restorer 516 creates updated versions of files on the client computer 514, as explained hereinabove. The archiver 517 decompresses the compressed files on the client computer 514 and extracts folders of files from archives on the client computer 514. If the archival option described in FIG. 4B is used, then the archiver 517 also archives the previous version of the files on the client computer 514 in order that the restorer 516 can generate the single file of the updated folder.

The download manager server 510 and the download manager client 522 implement the method of FIG. 3 to download the flies from the server computer 502 to the client computer 514. The downloading is not accomplished by known file transfer protocols, but rather involves a dedicated file transfer protocol over IP between the download manager client 522 and the download manager server 510 which implements all the steps of the method of FIG. 3.

The user specifics in the download manager client 522 which automatic post-download actions to take, for example, whether to save the downloaded version in its original format and if so, in which directory to save it. If the product's original format is a compressed file or archive of files, the automatic post-download actions may include decompressing and extracting the files using the archiver 517. If the product is a software program, then the automatic post-download actions may include installing the program.

The databases 508 and 520 are divided into two sections. The first section, called the index, contains detailed information regarding the products and versions currently managed by the client-server system 500, such as product name, version name and archival format. The second section, called the data, contains the base and delta files themselves, as will be explained hereinbelow with respect to FIG. 6.

The maintenance units 506 and 518 provide the system administrator on the server side and the user on the client side, respectively, with access to the information stored in the databases 508 and 520, respectively. The maintenance unit 506 further provides the system administrator with the ability to insert and delete versions of products from the server side of the client-server system 500. The maintenance unit 518 provides the user with the ability to delete versions of products from the client side of the client-server system 500. When a product version is inserted into the salver side of the client-server system 500, base and delta files are created and stored in the database 506 along with the detailed information about the product version. Similarly, when a product version is deleted from either side of to client-server system 500, the relevant base and delta files are removed from the database along with the detailed information about the product version.

An additional feature of the maintenance unit 518 is the ability to import versions of products from an external source to the client side of the client-server system 500, and to export versions of products from the client side of the client-server system 500 to an external source. Similarly, the maintenance unit 506 has the ability to import versions of products from an external source to the server side of the client-server system 500, and to export versions of products from the server side of the client-server system 500 to an external source. External sources include compact discs, hard disks, and any other suitable storage medium for electronic files.

The product version imported into the client-server system 500 is stared on the external source with the base file and delta files already in the special format mentioned hereinabove with respect to FIG. 3, and with the requisite information to be stored in the database. Similarly, when a product version is exported from the client-server system 500, its base file and delta files are stored on the external source in the special format mentioned hereinabove along with the requisite information that was stored in the database.

This import/export feature is particularly useful for imparting products having very large files, such as a telephone book, because downloading such large flies from the Internet is prohibitively time-consuming with current technology. Once a particular version of the telephone book has been imported into the server and client sides of the client-server system 500, subsequent versions may be imported into the server side and relatively small delta files may be downloaded from the server to the client.

Yet another feature of the maintenance unit 518 is the ability to restore previous versions of files downloaded to the client computer 514. For example, a user may download an updated version of software, install and evaluate it, and then decide to reinstall a previous version of the software.

Another important feature of the present invention is the ability to push files such as product versions and interactive marketing material to a target audience that has already expressed an interest in receiving and saving those files. This feature is embodied in the automatic update client 524 and automatic update server 512. The user specifies in the automatic update client 524 which products should be automatically updated as soon as a new version is available, and selects one of three service levels for each product notification, informative and marketing material, and automatic download of new versions.

For each product, the server from which the client downloaded the previous version is dominated as the primary server for updates. The user may designate another server as an alternate server for updates. For example, if a particular product was downloaded from a mirror site, the user may select the Web site of the product's manufacturer as an alternate server for updates. The automatic update client 524 tells the automatic update servers 512 running on the primary server computer and alternate server computer what versions of the product are at the client computer 514. If one of the servers has a version which is newer than the version on the client computer 514, then a response is sent to the automatic update client 524, according to the service level as configured by the user for the product.

One of the important features of the present invention is that the automatic update client 524 does not require the user to initiate the contact with the automatic update servers 512. Rather, communication between the automatic update client 524 and the automatic update servers 512 is initiated according to preferences configured in advance by the user, for example, at set time intervals or at each reconnection to the Internet.

In the notification service level, when a new version of the product is available, a notification is sent to the automatic update client 524, which displays the notification to the user. In the information service level, when a new version of the product is available, flies containing information and marketing material about the new version are sent to the automatic update client 524, which can display them to the user immediately or later at the user's convenience. The files may he of any format, including text, audio, video and animation. In the automatic download service level, when a now version of the product is available, the delta file of the new version and the version at the client is automatically downloaded to the client computer 514 and the new version is restored, without the user's intervention. The new version may then have post-download actions automatically performed on is such as saving decompression, extraction, and installation, all still without the user's intervention.

Figure 6:
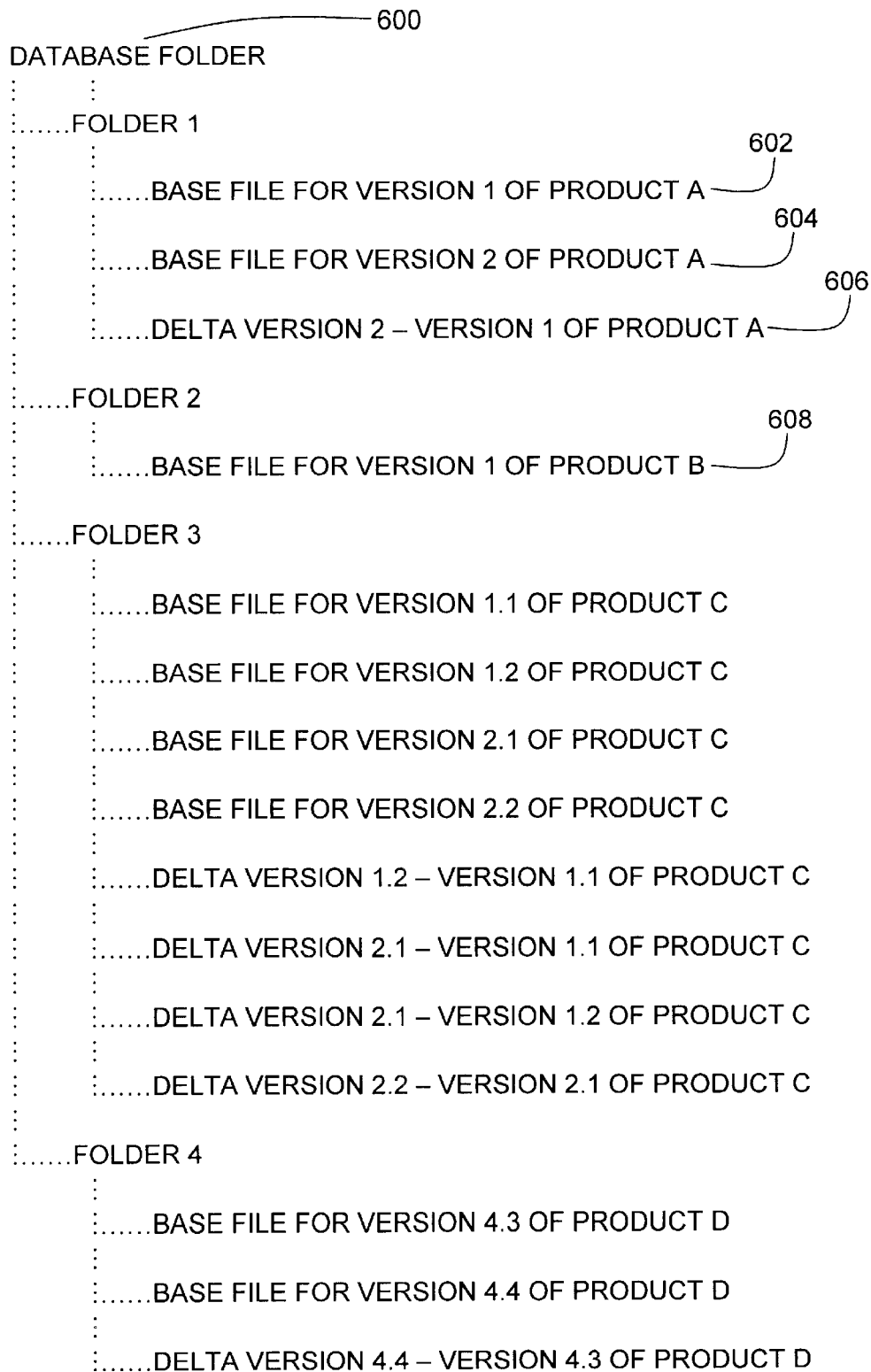
FIG. 6 is a schematic illustration of an example database, helpful in understanding the present invention.

According to a preferred embodiment of the present invention, the databases 508 and 520 are implemented on the server computer and the client computer, respectively, in the format of folders and files. This is shown in FIG. 6, to which reference is now made, which is a schematic illustration of an example database folder 600. Each product managed by the server is represented as a subfolder of the database folder 600. In this example, products A, B, C and D are managed by the server, and there are four corresponding subfolders, "FOLDER 1", "FOLDER 2", "FOLDER 3", and "FOLDER 4". The actual product name may be a long name and may contain special characters. Therefore, in order to ensure portability among different computers and different operating systems and file systems, a different name is used for the subfolder.

In the present example, product A has two versions, version 1 and version 2. The subfolder for product A, "FOLDER 1", contains three files. The first the 602 is a bass file for version 1, the second file 604 is a base file for version 2, and the third file 606 is a delta file for the difference between version 2 and version 1. Product B has only one version, version 1, so the subfolder for product B, "FOLDER 2", contains only a file 608 which is a base file for version 1.

Product C has four versions, versions 1.1, version 1.2, version 2.1 and version 2.2. The subfolder for product C, "FOLDER 3", contains eight files: one base file for each version, and four delta files. It will be appreciated that the server may not necessarily have one delta file for each possible combination of the versions. For example, the server does not have a delta file for the difference between version 2.2 and version 1.2, nor does it have a delta file for the difference between version 2.2 and version 1.1.

It will also be appreciated that the first version of the product ever released by the manufacturer. For example, product D may have several versions, from version 4.3 onwards are managed by the server and therefore appear in the databases 508 and 520.

The databases 508 and 520 are implemented with an additional file on each server computer and client computer. The additional file is an index text file with an entry for each file in the database, the entry containing additional information such as the post-download action, the option used to create the delta file and the size of the file.

Figure 7:
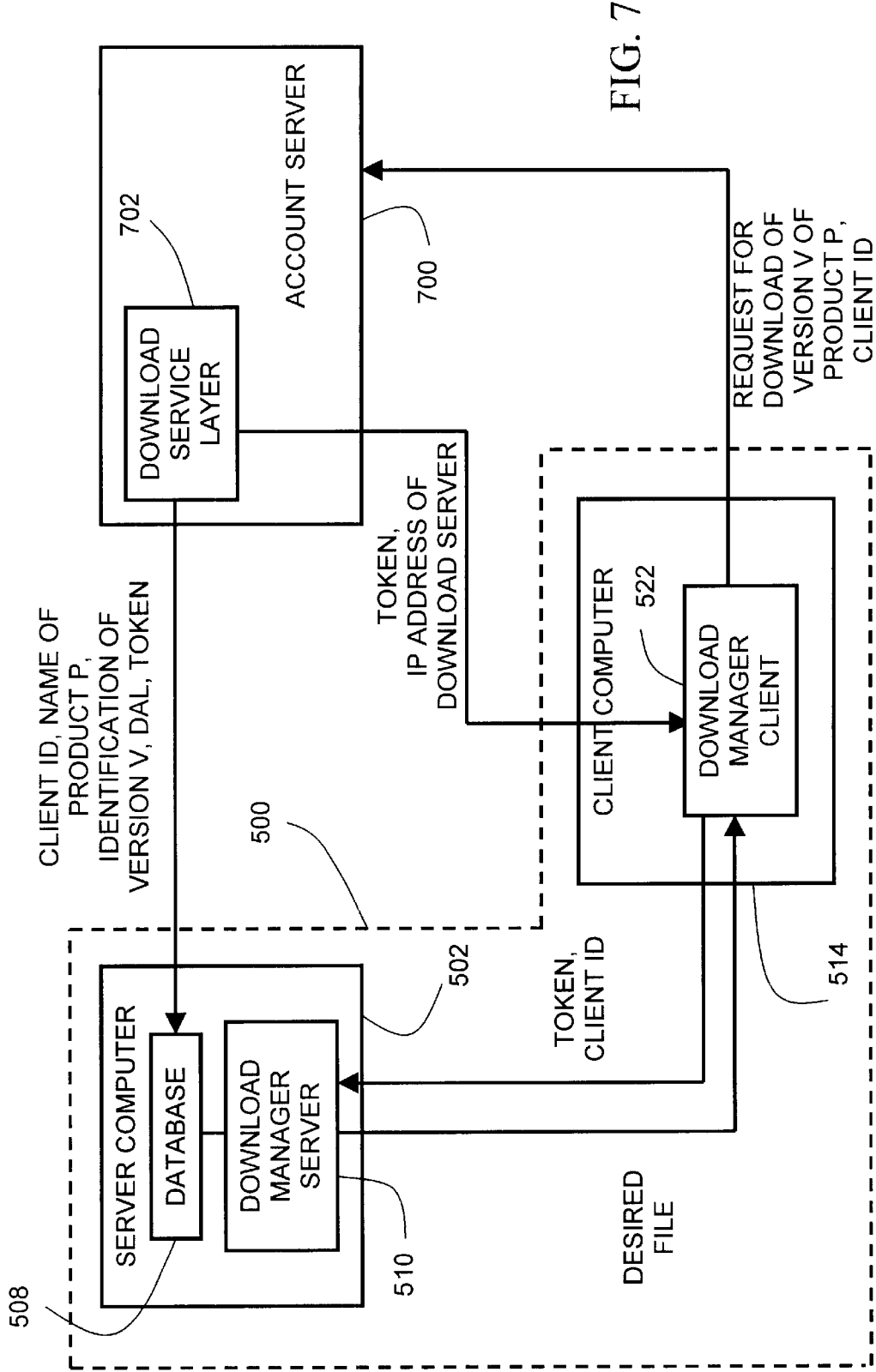
FIG. 7 is a schematic illustration of the client-server system of FIG. 5 and an account server, according to a preferred embodiment of the present invention.

In an alternative preferred embodiment of the present invention, the client-server system 500 of FIG. 5 is used in conjunction with an account server in order to provide download of files for authorized clients only. This is shown in FIG. 7, to which reference is now made, which is a schematic illustration of the client-server system 500 and an account server 700, according to a preferred embodiment of the present invention. The client server system 500 comprises the server computer 502 and the client computer 514. The server computer 502 comprises the download manager server 510 and the database 508. The client computer comprises the download manager client 522. A download service layer 702 is integrated with the account server 700 to provide the connection between the account server 700 and the client-server system 500.

The present invention provides a token-based authorization system for download of files. Each file in the database 508 has a distribution authorization level (DAL) associated with it. According to a preferred embodiment of the present invention, the DAL is an integer number, with the value zero for free distribution and a positive value of n for distribution requiring an authorization of level n. Since the DAL is per file, a wide range of download policies is possible, for example:

a) a complete product is free or not free;

b) specific versions are free, while other versions are not (all base and delta files for the free versions have a DAL value of zero, while the other files have positive DAL values);

c) once a user has a version, all updates are free (all base files have positive DAL valued and all delta files have zero DAL values);

d) there are four versions V1–V4; V2 and V4 are mainly bug fixes and are free, V3 is a major enhancement (all base files have positive DAL values, delta files from V1 to V2 and V3 to V4 have zero DAL values, delta files from V2 to V3, V1 to V3 (if any), V1 to V4 (if any) and V2 to V4 (if any) have positive DAL values).

Figure 8:
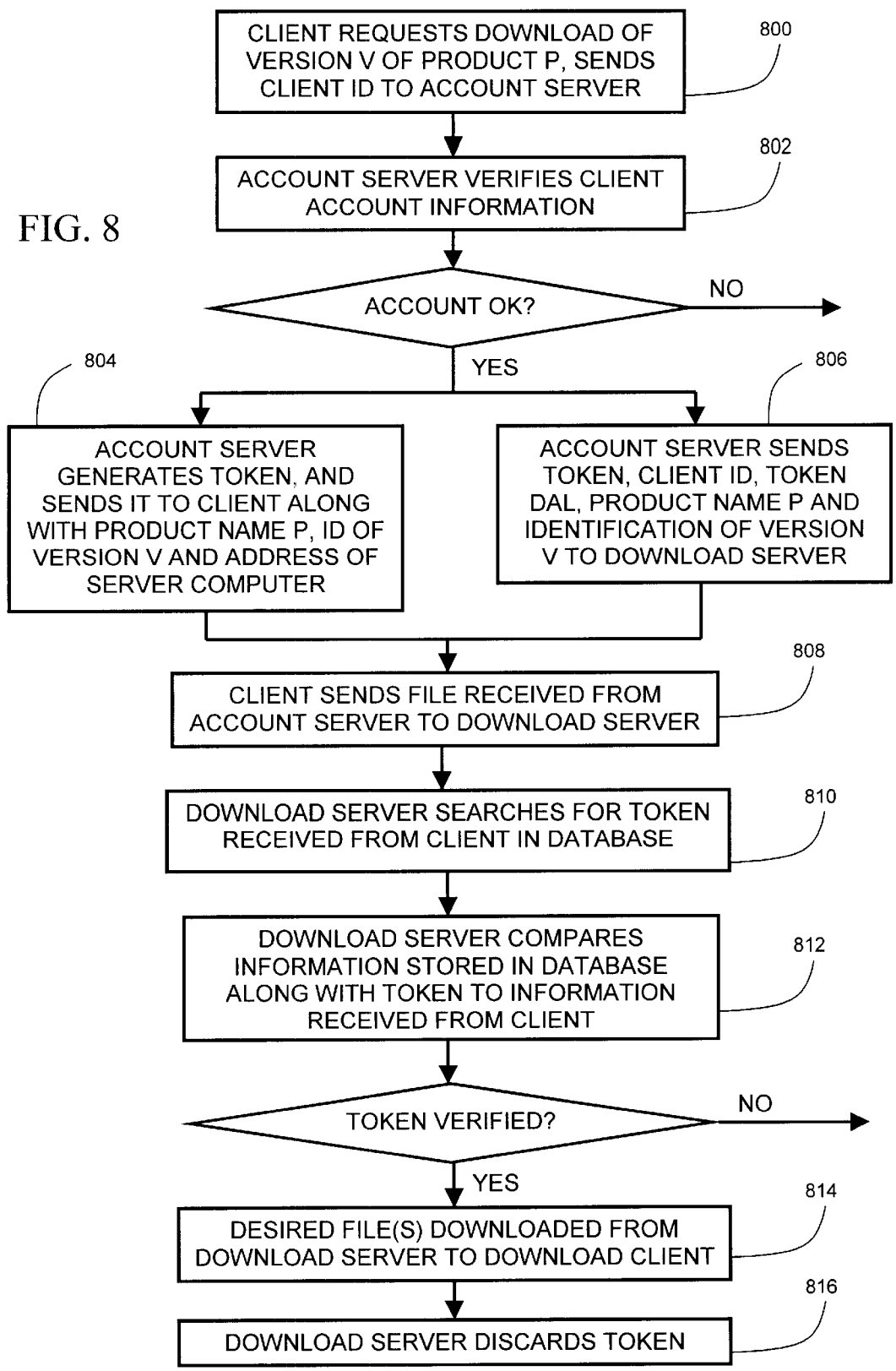
FIG. 8 is a schematic flowchart illustration of the method of operation of the system of FIG. 7.

Reference is now made additionally to FIG. 8, which is a schematic flowchart illustration of the method of operation of the system of FIG. 7. The client requests the download of a version V of a product P and is connected to the account server 700 (step 800). The client sends account information to the account server 700 along with a client ID that was generated and stored on the client computer 514 during the installation of the download manager client 522 (step 800). The client ID need not be uniquely associated with the client computer 514. It is sufficient that the client ID Is kept secret from other users, and that the possibility of two clients to have the same client ID is virtually zero. The account server 700 verifies the client account information (step 802). If the client account information has been verified, then the download service layer 702 generates a token and associates a DAL with the token (step 804). The download service layer 702 sends a file to the client containing the token, the product name P, an identification of the version V, and the address of the server computer 502 (step 804). The download service layer 702 also sends the token, its associated DAL, the client ID, the product name P and an identification of the version V to the server computer 502 (step 806). The server computer 502 stores this information in the database 508. According to a preferred embodiment of the present invention, security is enhanced by using an encryption key while transferring data from the download service layer 702 to the server computer 502. This prevents another server from pretending it is a download service layer. An additional encryption key is used while storing the token and associated information in the database 508. This prevents someone from scanning the database 508 in search of a suitable token.

The file sent in step 804 to the client invokes the download manager client 522, which contacts the server computer 502 according to the address contained in the file. The download manager client 522 sends the file it received in step 804 to the server computer 502, along with an inventory listing of versions of the product P at the client computer 514 (step 808). The download manager server 510 determines from the inventory the list of files that need to be downloaded from the server computer 502 to the client computer 514. The download manager 510 searches for the token received from the download manager client 522 in the database 508 (step 810), and compares the information stored in the database 508 along with the token to information received from the download manager client 522 (step 812). For example, the product name P and identification of the version V associated with the token in the database 508 must match the product name P and identification of the version V in the file sent by the client. The client ID associate with the token in the database 508 must match the client ID sent by the client to the download manager server 510. The DAL associated with the token in the database 508 must be no less than the DAL of any file in the list of files to be downloaded. If all of these criteria are fulfilled, then the download proceeds (step 814). Once the download of files is successfully completed, the download manager server 510 discards the token (step 816).

In a preferred embodiment of the present invention, the tokens are 128 bits long, transferred as a string of 32 hexadecimal digits.

It will be appreciated that since the token is for single use, giving the token and the client ID to another user cannot be used for duplicate downloads. It will also be appreciated that the file sent to the client by the download service layer 702 cannot be used by another client that does not know the client ID that is associated with the token in the file. Furthermore, the protocol between the download manager server 510 and the download manager client 522 cannot be replayed because of the challenge/response protocol.

It will also be appreciated that no user account identification ever reaches the server machine 502.

The benefits of the present invention are higher speed downloaded, the possibility to restore previous versions of downloaded files, resume of interrupted downloads from point or interruption, post-download actions, auto update services, and accounting for authorized downloads.

It will be appreciated by persons skilled in the ad that the present invention is not limited by what has been particularly shown and described herein above. Rather the scope of the invention is defined by the claims that follow:

What is claimed is:

1. A system for transferring a delta file from a first computer to a second computer, said first computer having a first version of a file and a second version of said file, said second computer having said first version of said file, the system comprising;
    a delta builder able to generate said delta file from said first and second versions on said first computer, said delta file comprising a first digital stamp generated from said first version on said first computer;
    a download manager able to transfer said delta file from said first computer to said second computer; and
    a restorer able to generate said second version from said first version on said second computer and said transferred delta file if a second digital stamp generated from said first version on said second computer matches said first digital stamp.

2. A system according to claim 1, wherein said delta file is generated based upon a bit analysis of said first and second versions on said first computer.

3. A system according to claim 1, wherein said download manager comprises:

a download manager server on said first computer; and
    a download manager client on said second computer.

4. A system according to claim 3, wherein said download manager server comprises means for communicating with said download manager client over an Internet Protocol (IP) network, and said download manager client comprises means for communicating with said download manager server over an Internet Protocol (IP) network.

5. A system according to claim 1, wherein said system further comprises:
    a database for storing said first and second versions of said file and for storing said delta file.

6. A system according to claim 5, wherein said system further comprises:
    a maintenance unit for importing an imported file into said database.

7. A system according to claim 6, wherein said imported file is a third version of said file.

8. A system according to claim 6, wherein said imported file is an additional delta file between one of said first and second versions and a third version of said file.

9. A system according to claim 1, wherein said system further comprises:
    a compressor for compressing said generated delta file; and
    a decompressor for decompressing said transferred delta file.

10. A system according to claim 1, wherein said system further comprises:
    means for automatically performing post-download actions on said generated second version.

11. A system according to claim 10, wherein said post-download actions include at least one of the group comprising saving said generated second version to a storage unit, decompressing said generated second version, extracting said generated second version and installing said generated second version.

12. A system according to claim 1, wherein said first version of said file is an archive of a first folder version of a folder of files, said second version of said file is a second folder version of said folder of files, and said system further comprises:
    an extractor for extracting said second folder version from said generated second file.

13. A system for transferring a delta file from a first computer to a second computer, said first computer having a first version of a folder of files and a second version of said folder, and said second computer having said first version of said folder, the system comprising:
    a delta builder for generating a delta folder from said first and second versions on said first computer;
    an archiver for archiving said delta folder into said delta file,
    a download manager for transferring said delta file from said first computer to said second computer;
    an extractor for extracting said delta folder from said transferred delta file; and
    a restorer tar generating said second version from said first version on said second computer and said extracted delta folder.

14. A system for resuming an interrupted transfer of a file from a first computer having a complete version of said file to a second computer having an incomplete version of said file, said incomplete version missing a portion of said complete version, and said incomplete version having previously been transferred to said second computer during said interrupted transfer, the system comprising:
- a download manager server on said first computer for transferring only said missing portion to said second computer, and
- a download manager client on said second computer for receiving said missing portion and combining it with said incomplete version to form said complete version on said second computer.

15. A token based authorization system for download of a file from a first computer to a second computer, the system comprising;
- a client on said second computer for requesting download of said file and for transferring account information to an account server;
- a download service layer, integrated with said account server, for generating a token, associating said token with a first authorization level and sending said token to said client if said account information is verified by said account server: and
- a server on said first computer for associating a second authorization level with sold file, for receiving said token and said first authorization level from said download service layer, for receiving said token from said client and for downloading said file to said client if said token received from said download service layer matches said token received from said client and if said first authorization level is no less than said second authorization level.

16. A system according to claim 15, wherein said client has a client identifier and said token is based upon said client identifier.

17. A method for transferring a delta file from a first computer to a second computer, said first computer having a first version of a file and a second version of said file, and said second computer having said first version of said file, the method comprising the steps of:
- generating a first digital stamp from said first version on said first computer;
- generating said delta file from said first and second versions on said first computer, said delta file comprising said first digital stamp;
- transferring said delta file from said first computer to said second computer;
- generating a second digital stamp from said first version on said second computer; and
- if said second digital stamp matches said first digital stamp, generating said second version from said first version on said second computer and said transferred delta file.

18. A method according to claim 17, wherein said delta file is generated based upon a bit analysis of said first and second versions on Said first computer.

19. A method according to claim 17, wherein said step of transferring comprises the step of communicating between said first computer and said second computer over an Internet Protocol (IP) network.

20. A method according to claim 17, wherein said method further comprises the steps of:
- storing said first version in a database;
- storing said second version in said database; and
- storing said delta file in said database.

21. A method according to claim 20, wherein said method further comprises the step of:
- importing an imported file into said database.

22. A method according to claim 21, wherein said imported file is a third version of said file.

23. A method according to claim 21, wherein said imported file is an additional delta file between one of said first and second versions and a third version of said file.

24. A method according to claim 17, wherein said method further comprises the steps of:
- compressing said generated delta file; and
- decompressing said transferred delta file.

25. A method according to claim 17, wherein said method further comprises the step of:
- automatically performing post-download actions on said generated second version.

26. A method according to claim 25, wherein said post-download actions include at least one of the group comprising saving said generated second version to a storage unit, decompressing said generated second version, extracting said generated second version and installing said generated second version.

27. A method according to claim 17, wherein said first version of said file is an archive of a first folder version of a folder of files, said second version of said file is a second folder version of said folder of files, and said method further comprises the step of:
- extracting said second folder version from said generated second file.

28. A method for transferring a delta file from a first computer to a second computer, said first computer having a first version of a folder of files and a second version of said folder, and said second computer having said first version of said folder, the method comprising the steps of:
- generating a delta folder from cold first and second versions on said first computer;
- archiving said delta folder into said delta file;
- transferring said delta file from said first computer to said second computer;
- extracting said delta folder from said transferred delta file; and
- generating said second version from said first version on said second computer and said extracted delta folder.

29. A method for resuming an interrupted transfer of a file from a first computer having a complete version of said file to a second computer having an incomplete version of said file, said incomplete version missing a portion of said complete version, and said incomplete version having previously been transferred to said second computer during said interrupted transfer, the method comprising the steps of:
- transferring only said missing portion to said second computer;
- receiving said missing portion; and
- combining it with said incomplete version to form said complete version on said second computer.

30. A method for downloading a file from a download server to a download client when the user of said download client is authorized to do so by an account server, the method comprising the steps of:
- associating said file with a first authorization level;
- verifying account details of sold user at said account server;
- if said step of verifying is successful,
  - generating a token on said account server and associating said token with a second authorization level;
  - sending said token from said account server to said download client;

sending said token and said second authorization level from said account server to said download server;

sending said token from said download client to said download server; and downloading said file from said download server to said client only if said second authorization level is no less than said first authorization level and if said token from said account server matches said token from said download client.

31. A method according to claim 30, wherein said download client has a client identifier and said token is based upon said client identifier.

32. A method for transferring files from a first computer to a second computer, the method comprising the steps of:

said second computer reporting a version indicator to said first computer, said version indicator indicating which versions, if any, of a target file currently reside on said second computer, including versions which are not installed on said second computer;

said first computer correlating said version indicator with either of at least one delta file and a base file in accordance with predetermined correlation criteria, thereby defining at least one correlated file; and said first computer transferring said at least one correlated file to said second computer.

33. A method according to claim 32, is the method further comprising the step of said second computer requesting said target file from said first computer.

34. A method according to claim 32, wherein said predetermined correlation criteria includes the size of said at least one correlated file.

35. A method comprising:

receiving a request to download a particular version of a file to a computer;

receiving a version indicator indicating which versions, if any, of said file currently reside on said computer, including base files and delta files that reside but are not installed, on said computer; and if said particular version does not currently reside on said computer, and if said currently residing base files and delta files are insufficient to generate said particular version on said computer, downloading to said computer the smaller of a) a base file of said particular version, and b) one or more delta files or a combination of a base file and one or more delta files, selected so that in conjunction with one of the currently residing versions on said computer, said particular version on said computer can be generated.

* * * * *

UNITED STATES PATENT AND TRADEMARK OFFICE
CERTIFICATE OF CORRECTION

PATENT NO. : 6,401,239 B1
DATED : June 4, 2002
INVENTOR(S) : M. Miron

It is certified that error appears in the above-identified patent and that said Letters Patent is hereby corrected as shown below:

Column 2,
Line 20, "sea" should be -- see --.
Line 27, "ties" should be -- files --.
Line 44, "an" should be -- on --.

Column 3,
Line 7, "is" should be -- if --.
Line 40, "Furthermore. In" should be -- Furthermore, in --.
Line 59, "version" should be -- versions --.

Column 4,
Line 26, "authorization." should be -- authorization --.
Line 54, "variations" should be -- versions --.
Line 58, "second, version" should be -- second version --.
Line 59, "folder," should be -- folder. --.

Column 6,
Line 10, "13" should be -- is --.
Line 25, after "client" delete -- it --.
Line 38, "is" should be -- the --.
Line 38, "the" should be -- file --.
Line 51, "it" should be -- is --.

Column 7,
Line 3, "storm" should be -- stores --.
Line 9, "versions" should be -- version --.
Line 57, "them" should be -- there --.
Line 58, "client" should be -- client, --.
Line 59, "308" should be -- 306 --.

Column 8,
Line 1, "308" should be -- 306 --.
Line 29, "Will" should be -- will --.
Line 65, "518" should be -- 516 --.
Line 67, "Is" should be -- is -- .

UNITED STATES PATENT AND TRADEMARK OFFICE
CERTIFICATE OF CORRECTION

PATENT NO. : 6,401,239 B1
DATED : June 4, 2002
INVENTOR(S) : M. Miron

It is certified that error appears in the above-identified patent and that said Letters Patent is hereby corrected as shown below:

Column 9,
Line 23, "flies" should be -- files --.
Line 29, "specifics" should be -- specifies --.
Line 55, "salver" should be -- server --.
Line 57, "506" should be -- 508 --.
Line 59, "to" should be -- the --.

Column 10,
Line 9, "stared" should be -- stored --.
Line 19, "imparting" should be -- importing --.
Line 20, "flies" should be -- files --.
Line 44, "dominated" should be -- designated --.

Column 11,
Line 2, "flies" should be -- files.
Line 7, "he" should be -- be --.
Line 9, "now" should be -- new --.
Line 14, "is" should be -- it, --.
Line 14, "saving" should be -- saving, --.
Line 33, "the" should be -- file --.
Line 33, "bass" should be -- base --.

Column 12,
Line 42, "Is" should be -- is --.

Column 13,
Line 15, "associate" should be -- associated --.
Line 38, "downloaded" should be -- downloads --.
Line 42, "ad" should be -- art --.
Line 51, "comprising;" should be -- comprising: --.

Column 14,
Line 60, "tar" should be -- for --.

UNITED STATES PATENT AND TRADEMARK OFFICE
CERTIFICATE OF CORRECTION

PATENT NO. : 6,401,239 B1
DATED : June 4, 2002
INVENTOR(S) : M. Miron

It is certified that error appears in the above-identified patent and that said Letters Patent is hereby corrected as shown below:

Column 15,
Line 12, "comprising;" should be -- comprising: --.
Line 20, "server:" should be -- server; --.
Line 22, "sold" should be -- said --.
Line 54, "Said" should be -- said --.

Column 16,
Line 32, "cold" should be -- said --.
Line 60, "sold" should be -- said --.

Column 18,
Line 1, delete "is".

Signed and Sealed this

Twenty-sixth Day of August, 2003

JAMES E. ROGAN
*Director of the United States Patent and Trademark Office*